United States Patent
Warnes et al.

(10) Patent No.: US 9,757,812 B2
(45) Date of Patent: Sep. 12, 2017

(54) METALLURGICALLY BONDED WEAR RESISTANT TEXTURE COATINGS FOR ALUMINUM ALLOYS AND METAL MATRIX COMPOSITE ELECTRODE FOR PRODUCING SAME

(71) Applicant: Al-Armor, Beaver, PA (US)

(72) Inventors: Bruce M. Warnes, Beaver, PA (US); Joseph A. Downie, Okatie, SC (US); Andrew C. Towns, Youngstown, OH (US); Roger W. Kaufold, Pittsburgh, PA (US)

(73) Assignee: Al-Armor, Beaver, PA (US)

( * ) Notice: Subject to any disclaimer, the term of this patent is extended or adjusted under 35 U.S.C. 154(b) by 0 days.

(21) Appl. No.: 15/187,921

(22) Filed: Jun. 21, 2016

(65) Prior Publication Data

US 2017/0028498 A1    Feb. 2, 2017

Related U.S. Application Data

(60) Provisional application No. 62/197,281, filed on Jul. 27, 2015.

(51) Int. Cl.
*B32B 15/01* (2006.01)
*B23K 9/04* (2006.01)
(Continued)

(52) U.S. Cl.
CPC .............. *B23K 9/04* (2013.01); *B23K 35/286* (2013.01); *C25D 11/16* (2013.01); *B23K 2203/10* (2013.01); *C22C 21/08* (2013.01)

(58) Field of Classification Search
CPC ...................................................... B32B 15/01
See application file for complete search history.

(56) References Cited

U.S. PATENT DOCUMENTS 3,544,761 A * 12/1970 Rosenberg ........... B23K 35/286
                                                    219/118
8,070,894 B2    12/2011 Branagan
(Continued)

OTHER PUBLICATIONS

Irissou et al., "Investigation of Al—Al2O3 Cold Spray Coating Formation and Properties", J. Thermal Spray Technology, vol. 16(5-6), pp. 661-668, Dec. 2007.*

(Continued)

*Primary Examiner* — Humera Sheikh
*Assistant Examiner* — Lucas Wang
(74) *Attorney, Agent, or Firm* — McKay & Associates, P.C.

(57) ABSTRACT

A protective coating for aluminum alloys, electrode for producing same and a coating process using the welding electrode. The protective coating and electrode comprise a composite consisting essentially of alumina particles in a matrix, wherein the matrix is a metal selected from the group consisting of aluminum or an aluminum alloy. The alumina particles consist of aluminum oxide in powder form. The coating process using the welding electrode above comprises the steps of: electro-spark depositing a composite on to a substrate, wherein the composite consists essentially of alumina particles in a matrix, wherein the matrix is a metal selected from the group consisting of aluminum or an aluminum alloy. The substrate herein is an aluminum alloy. The coatings involve only aluminum and aluminum compounds, thereby intermetallic compound formation and galvanic corrosion of the coating-substrate materials system is avoided.

6 Claims, 2 Drawing Sheets

(51) Int. Cl.
  *B23K 35/28* (2006.01)
  *C25D 11/16* (2006.01)
  *C22C 21/08* (2006.01)
  *B23K 103/10* (2006.01)

(56) References Cited

U.S. PATENT DOCUMENTS

| | | | |
|---|---|---|---|
| 8,124,240 B2 | 2/2012 | Ohmi et al. | |
| 8,133,595 B2 | 3/2012 | Narita | |
| 8,173,269 B2 | 5/2012 | Narita | |
| 8,262,938 B2 | 9/2012 | Matzdorf et al. | |
| 8,277,688 B2 | 10/2012 | Matzdorf et al. | |
| 8,424,513 B2 | 4/2013 | Oetting et al. | |
| 8,637,158 B2 | 1/2014 | Sander et al. | |
| 9,243,333 B2 | 1/2016 | Matzdorf et al. | |
| 2006/0292390 A1* | 12/2006 | Kassner | C23C 4/12 428/610 |
| 2006/0292392 A1* | 12/2006 | Froning | B23K 35/286 428/659 |
| 2014/0367894 A1* | 12/2014 | Kramer | C04B 35/522 264/482 |

OTHER PUBLICATIONS

Winnicki et al., "Effect of Gas Pressure and Temperature on Stereometric Properties of Al+Al2O3 Composite Coatings Deposited by LPCS Method", Archives of Metallurgy and Materials, vol. 59, Issue 3, pp. 879-886, Jan. 2014.*

MatWeb, "Overview of materials for 7000 Series Aluminum Alloy", http://www.matweb.com/search/DataSheet.aspx?MatGUID=ab9706916818406b80c22b7f39db0c78, accessed Apr. 24, 2017.*

Chow et al, "Properties of Aluminum Deposited by a HVOF Process", Jun. 2003, Journal of Thermal Spray Technology, vol. 12(2), pp. 208-213.*

U.S. Department of Defense—Environmental Security Technology Certification Program (ESTCP), Final Report, Electrospark Deposition for Depot-and Field-Level Component Repair and Replacement of Hard Chromium Plating, Project WP-0202, Sep. 7, 2006.

Occhionero, Mark A. et al., Aluminum Silicon Carbide (AlSiC) for Cost-Effective Thermal Management and Functional Microelectronic Packaging Design Solutions, Chartley, Massachusetts.

* cited by examiner

FIGURE 2

IMMERSION CORROSION TEST

TEST CONDITIONS: a) 100 HOUR EXPOSURE, b) CORRODANT SOLUTION WATER PLUS 1 wt.% NaCl, c) SOLUTION TEMPERATURE 50°C, d) SOLUTION AGITATED AND e) WEIGHT GAIN USED TO QUANTIFY EXTENT OF DEGRADATION.

REPORTED TEST RESULTS ARE THE AVERAGE OF DATA FROM TWO SAMPLES FOR EACH COATING TYPE TESTED.

| COATINGS of INVENTION | $\Delta M/A$ ($\mu$ grams/cm$^2$) |
|---|---|
| CZ | 643 |
| C22 | 857 |
| COMMERCIAL COATINGS | $\Delta M/A$ ($\mu$ grams/cm$^2$) |
| Product 1 | 4339 |
| Product 2 | 5874 |

METALLURGICALLY BONDED WEAR RESISTANT TEXTURE COATINGS FOR ALUMINUM ALLOYS AND METAL MATRIX COMPOSITE ELECTRODE FOR PRODUCING SAME

CROSS-REFERENCE TO RELATED APPLICATIONS

The present application claims benefit established by provisional application Ser. No. 62/197,281, filed Jul. 27, 2015, the contents of which are incorporated herein by reference.

BACKGROUND

Field of the Invention

The present application relates to protective coatings for metal alloys. Specifically, a metal matrix composite consisting essentially of an aluminum alloy and a hard aluminum compound is electro-spark deposited on a substrate, thereby metallurgically bonded to any aluminum alloy substrate.

Description of the Related Art

Coating aluminum alloys without impacting the alloy properties is impossible using typical techniques. State of the art coating processes are not suitable for aluminum alloys because of the following problems related to application of commercially available protective coatings on Al alloys. First, aluminum engineering alloys are often age hardened, and so, any thermal cycle following controlled aging (precipitation heat treatment) can cause over aging, that is, it will weaken the alloy. Conventional coating systems (examples include thermal spray, diffusion processes, cathodic arc PVD, electron beam PVD, cold spray among others) require a post coat thermal cycle to achieve a metallurgical bond (a diffusion bond). Hence, a metallurgical bond cannot be obtained between conventional coating systems and an aluminum alloy without damaging the mechanical properties of the substrate. Second, aluminum forms intermetallic compounds (hard brittle materials) with nearly all other known metals (including all metals in conventional coating systems), and so, any thermal process intended to form a diffusion bond between the coating and the aluminum alloy substrate will result in intermetallic compound formation. The formation of brittle layers in a coating can cause poor mechanical properties, that is, cracking and spalling of the coating. Third, galvanic corrosion can occur whenever different metals in electrical contact are exposed to an aggressive environment. Nearly all components of state of the art protective coating systems will form a galvanic couple with aluminum or aluminum alloys, so rapid corrosion degradation will occur whenever the state of the art materials system (substrate and coating) is exposed to an aggressive environment. Consequently, the most successful coatings for aluminum alloys are mechanically bonded overlay products (primarily thermal spray), but, due to the problems discussed (poor bond strength and galvanic corrosion), these products have limited service life.

Needed then is a metal matrix composite electrode for electro spark deposition (ESD) which can make metallurgical bonded coatings on aluminum alloys without any of the problems encountered with state of the art coating systems.

SUMMARY

The invention comprehends a protective coating, a metal matrix composite (MMC) electrode for producing same and a coating process using the MMC welding electrode. The protective coating for aluminum alloys comprises a composite consisting essentially of alumina particles in a matrix, wherein the matrix is a metal selected from the group consisting of aluminum or an aluminum alloy. In the preferred embodiment the alumina particles consist of aluminum oxide in powder form. The coating can be textured by deposition of aluminum protrusions on the substrate (aluminum alloy electrode) or textured with additives (aluminum plus aluminum oxide electrodes) and both types of textured coatings can further be hard coated (hard anodized).

The welding electrode to produce the protective coating comprises a metal matrix composite consisting essentially of alumina particles in a matrix, wherein the matrix is a metal selected from the group consisting of aluminum or an aluminum alloy. As above, the alumina particles consist of aluminum oxide in powder form.

The coating process using the welding electrode above comprises the steps of: electro-spark depositing a composite on to a substrate, wherein the composite consists essentially of alumina particles in a matrix, wherein the matrix is a metal selected from the group consisting of aluminum or an aluminum alloy. The substrate herein is an aluminum alloy. In an alternative embodiment, the coating process comprises electro-spark depositing aluminum on an aluminum alloy to form a textured surface; and, hard anodizing the textured surface.

BRIEF DESCRIPTION OF THE DRAWINGS

FIG. 2 shows immersion corrosion test results of alloy 6061 coupons with instant coatings (C-22 and CZ), a prior art texture coating for aluminum alloys and a prior art wear resistant coating under particular test conditions.

DETAILED DESCRIPTION OF THE PREFERRED EMBODIMENT

Figure 1:
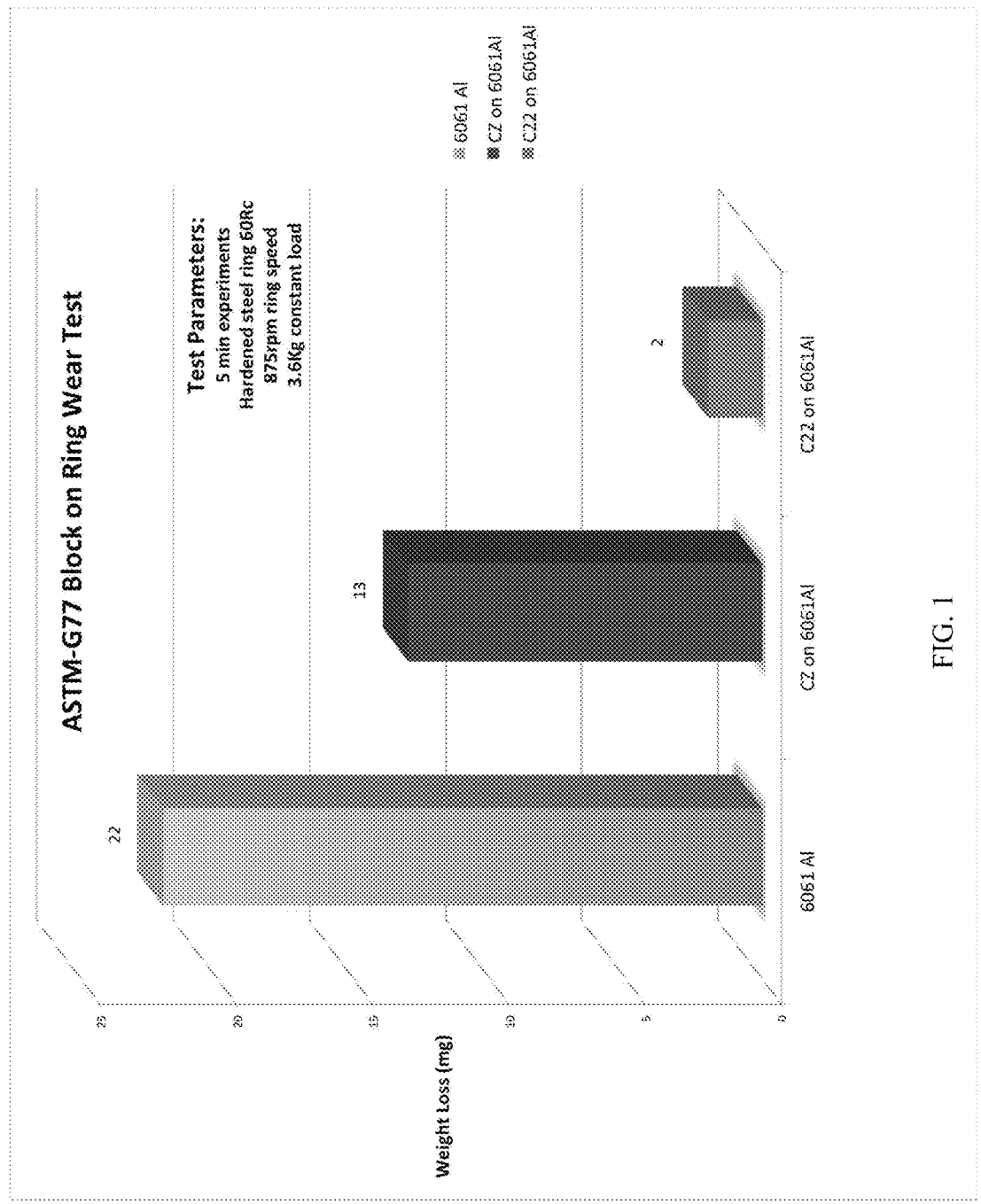
FIG. 1 shows block on ring wear test results of alloy 6061 and of alloy 6061 with the instant coating under particular test conditions.

Electro Spark Deposition (ESD) is a pulsed micro-welding process that causes insignificant heating of the substrate during coating deposition, and so, it can be used to make metallurgically bonded (welded) coatings on aluminum alloys without over aging them. To avoid intermetallic compound formation, an ESD electrode consisting of an aluminum or aluminum alloy matrix composite with an aluminum oxide particle dispersion (a metal matrix composite or MMC) is utilized herein. The coating produced by ESD with the instant MMC electrode has alumina particles in an aluminum or aluminum alloy matrix. Since the coating deposit contains only aluminum and aluminum compounds, the formation of intermetallic compounds between the coating and the substrate is not possible. The coating has a bond strength similar to alloy tensile strength (>13,000 psi) of the substrate compared to mechanically bonded products with typical bond strength of about 2000 psi for other commercially available coatings. The coating preferably has a thickness in a range of 10 µm to 100 µm. In addition, since the coating deposit contains only aluminum and aluminum compounds, galvanic corrosion of the material system (coating and substrate) in service is prevented. Corrosion resistance provided is far superior to commercially available state of the art wear and/or texture coatings for aluminum alloys.

More particularly, the present protective coating for aluminum alloys comprises a composite consisting essentially of alumina particles in a matrix, wherein the matrix is a metal selected from the group consisting of aluminum or an aluminum alloy. Although the particle size, shape and surface area of 'particles' may vary, that is, powder, whiskers or fibers among others, in the preferred embodiment alumina particles as used herein means aluminum oxide in powder form.

The substrate surface can be textured by aluminum deposition or textured by deposition of aluminum and additives (MMC electrodes) and either type deposit can further be hard coated (hard anodized). Surface finishes may vary and range from 100 μ-in to 1400 μ-in for example. Aluminum is a relatively soft material, and so, wear is a significant mode of failure in many applications. In addition, aluminum plates are used in floors and other applications where a rough surface is needed for traction. In both cases, a metallurgically bonded coating (smooth or rough) containing a hard phase or having a top coat is needed to reduce wear and/or increase the coefficient of friction.

Aluminum alloys are used in a variety of industries and commercial applications, which include but are not limited to ships, airplanes, cars, trucks, trailers and battle tanks. In all cases however, the coating of the invention would be used to provide superior wear resistance and/or increased coefficient of friction to a component of the machine.

Because ESD equipment is used to produce a micro-weld deposit of aluminum and aluminum oxide on an aluminum alloy substrate, a welding electrode of a particular make-up must produce the protective coating. The welding electrode herein to produce the protective coating comprises a metal matrix composite consisting essentially of alumina particles in a matrix, wherein the matrix is a metal selected from the group consisting of aluminum or an aluminum alloy. As above, the preferred alumina particles consist of aluminum oxide in powder form.

The manufacture of aluminum-aluminum oxide metal matrix composite electrodes can be accomplished by several techniques, examples include, but are not limed to, metal infiltration molding, extrusion, thermal spray, pressing and sintering powder mixtures and cold spray. For example, metal infiltration molding involves injection of liquid metal into a mold containing solid media (particles, or fiber etc.) to create a metal matrix composite (MMC). 'Infiltration' can be accomplished by using pressure or vacuum to force liquid aluminum alloy into a tube filled with aluminum oxide powder to create the MMC electrode rod, which can thereby be used for electrodes in the coating process. The MMC electrode and ESD process yield a coating on aluminum alloys without either intermetallic compound formation or over aging of the substrate, and the coating of the invention eliminates the possibility of galvanic corrosion between the coating and the substrate in service.

Electro spark deposition (ESD) is the only coating process that does not cause significant heating of the substrate or require post coat heat treatment to obtain a metallurgical bond, so it is ideally suited to coating application on aluminum alloys. Accordingly, the instant coating process using the welding electrode above comprises the steps of: electro-spark depositing a composite on to a substrate, wherein the composite consists essentially of alumina particles in a matrix, wherein the matrix is a metal selected from the group consisting of aluminum or an aluminum alloy. The substrate herein is an aluminum alloy. Critical is that both the aluminum-aluminum oxide MMC electrode and the ESD coating process are necessary to production of a metallurgically bonded coating on aluminum alloys without formation of intermetallic compounds, without damage to the mechanical properties of the substrate, and without the possibility of galvanic corrosion in service.

In an alternative embodiment, the coating process comprises electro-spark depositing aluminum on an aluminum alloy to form a textured surface; and, hard anodizing the textured surface. This approach yields a metallurgically bonded texture coating of aluminum on the substrate with a continuous layer of aluminum oxide over the entire surface. Our data shows this approach increases the coefficient of friction and the wear resistance, plus it should provide improved corrosion resistance due to the protective layer of aluminum oxide over the entire surface.

EXAMPLES

FIG. 1 shows ASTM G-77 Block on Ring wear test results for a 6061 alloy block and for 6061 alloy blocks with the instant coatings (CZ and C22) under particular test conditions. Sliding wear test results demonstrate that both the coatings of the invention have better wear resistance than alloy 6061, the aluminum plus aluminum oxide particulates (C-22 coating) has wear resistance twelve (12×) times better than uncoated alloy 6061 at 3.6 Kg load and the hard anodized aluminum coating (CZ) has wear resistance 1.7× better than alloy 6061 at 3.6 Kg load.

FIG. 2 shows Immersion Corrosion Test results from alloy 6061 coupons with instant coatings (C-22 and CZ), a prior art texture coating for aluminum alloys and a prior art wear resistant coating under particular test conditions. Immersion corrosion test results indicate: a) the hard anodized aluminum coating has the best corrosion resistance of the products considered, b) the aluminum plus aluminum oxide particulate composite coating exhibited somewhat greater degradation than the anodized coating (1.3× greater weight gain than CZ), and c) the prior art products have significantly worse corrosion resistance than either coating of the invention (Product 1 exhibited 6.8× greater weight gain than CZ and Product 2 exhibited 9.1× greater weight gain than CZ). Both the prior art coatings are mechanically bonded thermal spray products, and in both cases, composition differences between the coating and the substrate are sufficient to cause galvanic corrosion in the test.

We claim:

1. A composite material for use as an engineering alloy consisting of:
   a protective coating consisting of alumina particles in a matrix, wherein said matrix is a metal selected from the group consisting of aluminum and an aluminum alloy; and, an aluminum alloy substrate, wherein said aluminum alloy substrate is an age-hardened aluminum alloy having electro-spark deposited thereon said protective coating to form said composite material, wherein said protective coating is metallurgically bonded as a continuous layer to an entire surface of said aluminum alloy substrate, and wherein said composite material is formed without intermetallic compound formation between said protective coating and said aluminum alloy substrate.

2. The composite material of claim 1, wherein said alumina particles consist of aluminum oxide in powder form.

3. The composite material of claim 1, further comprising aluminum protrusions added to said protective coating to form a textured coating having a surface finish in a range of 100 μ-in to 1400 μ-in.

4. The composite material of claim 1 including said protective coating having a thickness in a range of 10 μm to 100 μm.

5. The composite material of claim 1, wherein said protective coating has a bond strength to said aluminum alloy substrate of greater than 13,000 psi.

6. The composite material of claim 1, wherein said aluminum alloy substrate is aluminum 6061.

* * * * *